United States Patent
Kiyohara et al.

(10) Patent No.: US 9,207,475 B2
(45) Date of Patent: Dec. 8, 2015

(54) DISPLAY APPARATUS

(75) Inventors: Toru Kiyohara, Tokyo (JP); Masayuki Kawano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/557,019

(22) Filed: Jul. 24, 2012

(65) Prior Publication Data

US 2013/0027629 A1 Jan. 31, 2013

(30) Foreign Application Priority Data

Jul. 27, 2011 (JP) .................................. 2011-164487

(51) Int. Cl.
*G02F 1/1333* (2006.01)

(52) U.S. Cl.
CPC ............ *G02F 1/133308* (2013.01); *G02F 2001/133331* (2013.01); *G02F 2202/28* (2013.01)

(58) Field of Classification Search
CPC .............. G02F 1/133512; G02F 1/133308; G02F 1/133528; G02F 1/1339; G02F 2001/133331; G02F 2202/28; G02B 6/005; B82Y 10/00; C08J 5/043
USPC ......... 349/58–65, 110, 111, 137, 158
See application file for complete search history.

(56) References Cited

U.S. PATENT DOCUMENTS

| | | | |
|---|---|---|---|
| 7,259,803 B2 * | 8/2007 | Akada et al. ................ | 428/1.53 |
| 8,233,107 B2 * | 7/2012 | Oohira ........................... | 349/58 |
| 2008/0143906 A1 * | 6/2008 | Allemand et al. .............. | 349/43 |
| 2009/0066862 A1 | 3/2009 | Ishii et al. | |
| 2009/0086120 A1 | 4/2009 | Sasaki et al. | |
| 2009/0086123 A1 * | 4/2009 | Tsuji et al. ...................... | 349/58 |
| 2009/0185100 A1 * | 7/2009 | Matsuhira et al. .............. | 349/58 |
| 2009/0185101 A1 | 7/2009 | Matsuhira et al. | |
| 2009/0225258 A1 | 9/2009 | Yanagihara et al. | |
| 2010/0002166 A1 * | 1/2010 | Oohira ........................... | 349/58 |
| 2010/0157218 A1 | 6/2010 | Ishii et al. | |
| 2011/0134378 A1 | 6/2011 | Tsuboi et al. | |

FOREIGN PATENT DOCUMENTS

| CN | 101387769 A | 3/2009 |
|---|---|---|
| CN | 101398545 A | 4/2009 |

(Continued)

OTHER PUBLICATIONS

Birendra Bahadur, Liquid Crystals Applications and Uses, 1990, World Scientific, vol. 1, pp. 171-194.*

(Continued)

*Primary Examiner* — Dung Nguyen
*Assistant Examiner* — David Chung
(74) *Attorney, Agent, or Firm* — Studebaker & Brackett PC

(57) ABSTRACT

A display apparatus that accommodates a display panel of displaying an image in a housing, the display apparatus comprises: a transparent protective member that covers a part of the housing and is arranged at a display face of the display panel; a transparent adhesive member that is arranged at a position corresponding to a display area of the display panel on a face of the transparent protective member, which faces the display panel, so that the display panel is stuck; and an adhesive member that is arranged at a peripheral area, which is provided from an outside of the display area of the display panel up to an end portion of the transparent protective member.

2 Claims, 3 Drawing Sheets

(56) References Cited

FOREIGN PATENT DOCUMENTS

| | | |
|---|---|---|
| CN | 101398559 A | 4/2009 |
| CN | 101526684 A | 9/2009 |
| JP | 07-036242 U | 7/1995 |
| JP | 2007-279554 A | 10/2007 |
| JP | 2009-109855 A | 5/2009 |
| JP | 2009-163132 A | 7/2009 |
| JP | 2009-216764 A | 9/2009 |
| JP | 2010-015093 A | 1/2010 |
| JP | 2010-053240 A | 3/2010 |
| JP | 2011-075605 A | 4/2011 |
| JP | 2011-138099 A | 7/2011 |
| WO | 2007/121093 A1 | 10/2007 |

OTHER PUBLICATIONS

Notification of the First Office Action issued by the State Intellectual Office of P.R.C on Jul. 25, 2014, which corresponds to Chinese Patent Application No. 201210262805.4 and is related to U.S. Appl. No. 13/557,019; with English language translation.

An Office Action; "Notification of Reasons for Refusal," issued by the Japanese Patent Office on Feb. 24, 2015, which corresponds to Japanese Patent Application No. 2011-164487 and is related to U.S. Appl. No. 13/557,019; with English language translation.

An Office Action, "Notification of the Second Office Action," issued by the State Intellectual Office of P.R.C on Feb. 25, 2015, which corresponds to Chinese Patent Application No. 201210262805.4 and is related to U.S. Appl. No. 13/557,019; with English language translation.

An Office Action; "Notification of Reasons for Refusal," issued by the Japanese Patent Office on Sep. 29, 2015, which corresponds to Japanese Patent Application No. 2011-164487 and is related to U.S. Appl. No. 13/557,019; with English language translation.

* cited by examiner

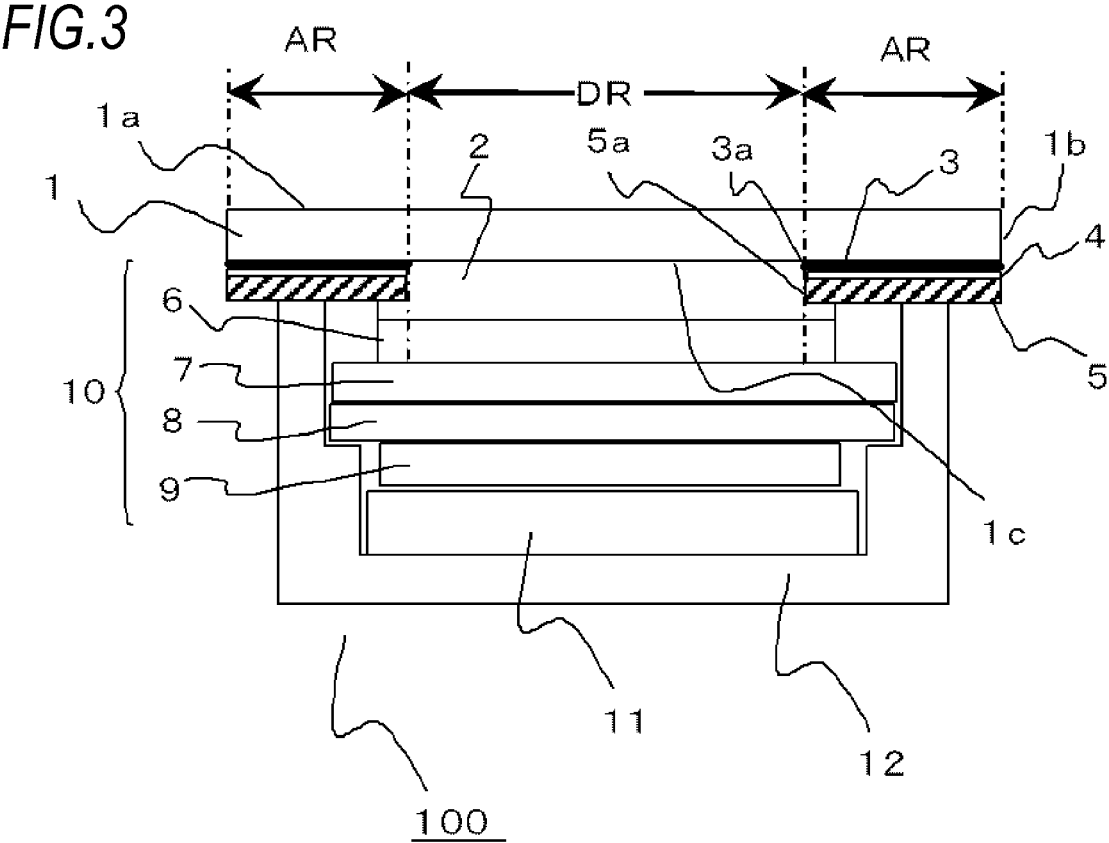
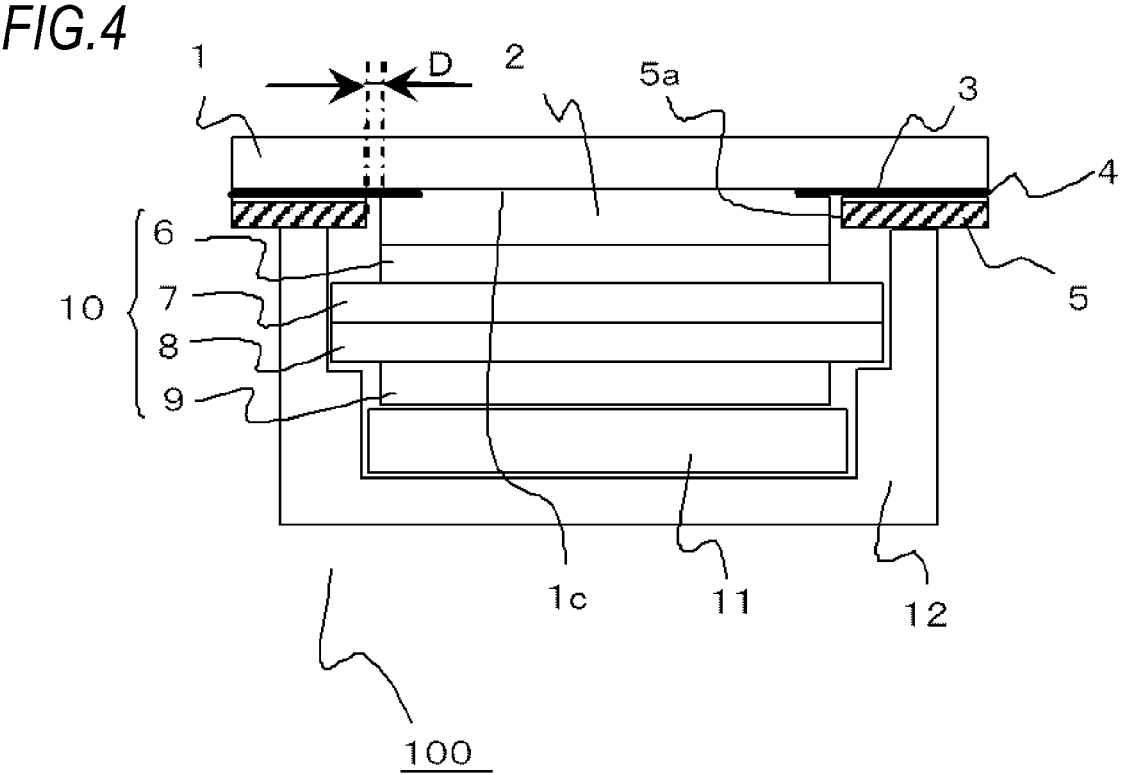

DISPLAY APPARATUS

CROSS-REFERENCE TO RELATED APPLICATION

This application claims priority from Japanese Patent Application No. 2011-164487 filed on Jul. 27, 2011, the entire subject matter of which is incorporated herein by reference.

TECHNICAL FIELD

This disclosure relates to a display apparatus having a protective member of protecting a display face of a display panel.

BACK GROUND

In recent years, a display apparatus is provided with a protective plate made of glass plate and the like so as to protect a face thereof. Also, in a display apparatus that is used in a portable phone, a portable information terminal and the like, a protective plate larger than the display apparatus is arranged on a face of a housing of the display apparatus and is exposed to improve the functionality and design features. In the display apparatus, since the protective plate is arranged on the face, in order to suppress glass fragments from being scattered when the protective plate is broken due to a shock from the outside, the protective plate is provided with a anti-scattering film made of photo-curable resin or is stuck with a anti-scattering sheet (refer to JP-A-2007-279554, JP-A-2009-216764 and JP-UM-A-H7-36242).

SUMMARY

According to a method of forming the anti-scattering film by the photo-curable resin, which is disclosed in JP-A-2007-279554, the resin is shrunken upon curing. Since there is a difference of shrinkage ratios between a face having the resin applied thereto and a face having no resin, the deflection or deformation is caused in the protective plate.

In a liquid crystal display apparatus disclosed in JP-A-2009-216764, a protective plate is arranged on a display face of a liquid crystal module and a anti-scattering sheet is closely stuck to a face of the protective plate. However, the anti-scattering sheet is pealed off in the vicinity of the protective plate due to the long-time using.

Also, in a handwriting input apparatus disclosed in JP-UM-A-H7-36242, a transparent film that suppresses glass scattering is stuck to a lower face of a glass plate put on a liquid crystal display apparatus. However, the glass plate is provided to the liquid crystal display apparatus with sandwiching an air layer therebetween. Accordingly, when a refractive index of the transparent film is different from that of the glass, a multi-reflection is caused so that unevenness appearance is caused.

Accordingly, this disclosure provides at least a display apparatus capable of suppressing fragments of a protective plate from being scattered and thus securing a safety without deteriorating the visibility even when the protective plate arranged on a face of the display apparatus is broken.

With taking into consideration the above, a display apparatus that accommodates a display panel of displaying an image in a housing, the display apparatus comprises: a transparent protective member that covers a part of the housing and is arranged at a display face of the display panel; a transparent adhesive member that is arranged at a position corresponding to a display area of the display panel on a face of the transparent protective member, which faces the display panel, so that the display panel is stuck; and an adhesive member that is arranged at a peripheral area, which is provided from an outside of the display area of the display panel up to an end portion of the transparent protective member.

According to the display apparatus of this disclosure, it is possible to suppress fragments of a protective member from being scattered and thus securing a safety without deteriorating the visibility even when the protective member arranged on a face of the display apparatus is broken.

BRIEF DESCRIPTION OF THE DRAWINGS

The foregoing and additional features and characteristics of this disclosure will become more apparent from the following detailed descriptions considered with the reference to the accompanying drawings, wherein:

FIG. 3 is a sectional view illustrating the display apparatus according to an illustrative embodiment of this disclosure;

FIG. 4 is a sectional view illustrating a display apparatus according to an illustrative embodiment of this disclosure.

DETAILED DESCRIPTION

Figure 1:
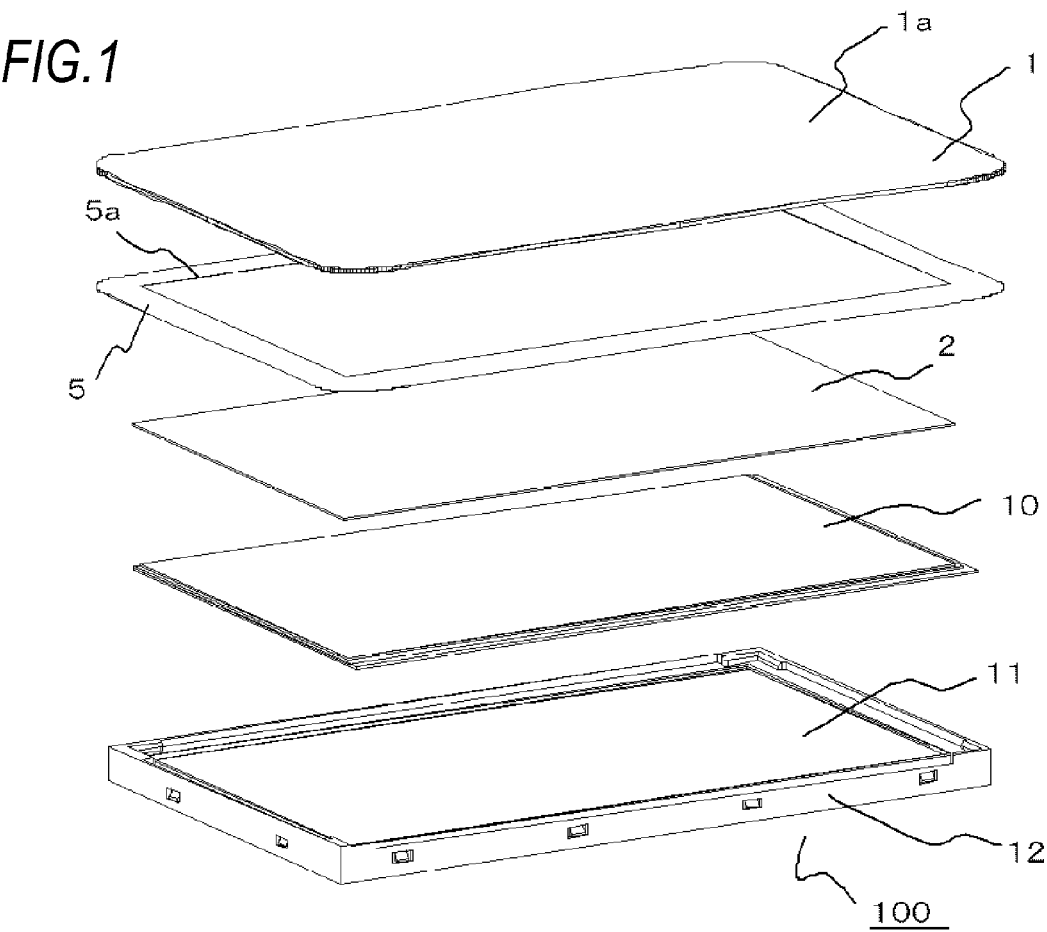
FIG. 1 is an exploded perspective view illustrating a display apparatus according to an illustrative embodiment of this disclosure.

Hereinafter, illustrative embodiments of a planar light source apparatus of this disclosure will be described with reference to the drawings. In the respective drawings, the same reference numerals indicate the substantially same elements.

First Illustrative Embodiment

Figure 2:
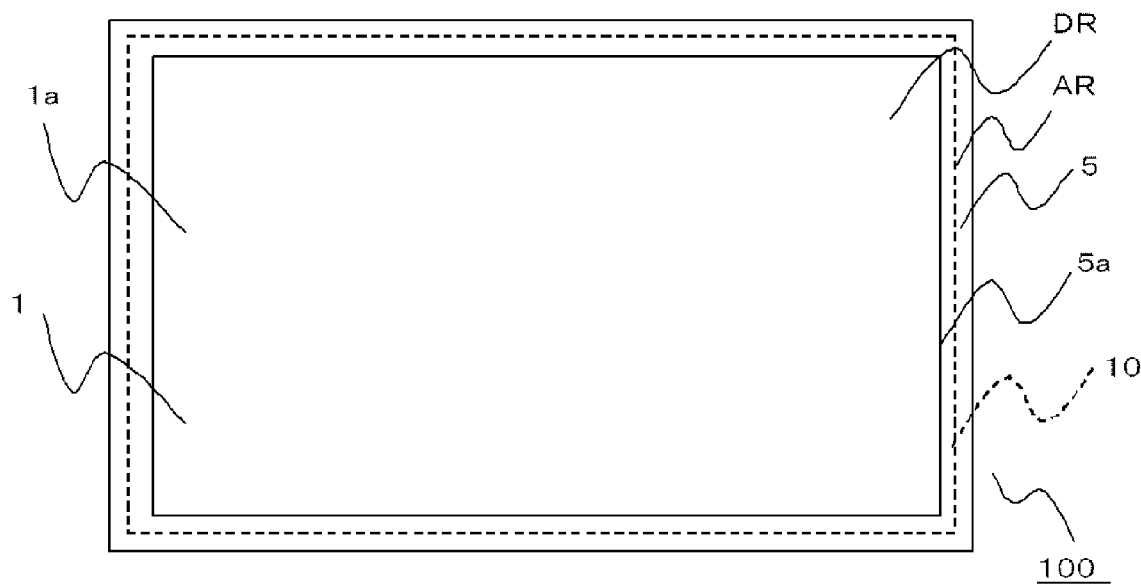
FIG. 2 is a plan view illustrating the display apparatus according to an illustrative embodiment of this disclosure.

FIG. 1 is an exploded perspective view illustrating a display apparatus according to an illustrative embodiment of this disclosure, FIG. 2 is a plan view illustrating the display apparatus shown in FIG. 1, and FIG. 3 is a sectional view of the display apparatus shown in FIG. 2.

As shown in FIGS. 1 to 3, a display panel 10 has a TFT (Thin Film Transistor) substrate 8, which is a first substrate made of glass and the like, and an opposing substrate 7, which is a second substrate. The two substrates are bonded, and liquid crystals (not shown) are injected between the opposing substrate 7 and the TFT substrate 8. An upper polarization plate 6 and a lower polarization plate 9 smaller than the substrates are stuck to a surface of the respective substrates. Here, the TFT substrate 8 is formed with pixels including TFTs, common electrodes and the like, and the opposing substrate 7 is formed with a color filter, opposing electrodes of the pixels and the like. Also, a circuit substrate (not shown) for input an image signal to the display panel 10 is arranged on the TFT substrate 8. A backlight unit 11 is arranged at a backside at which the lower polarization plate 9 of the display panel 10 is arranged. The display panel 10 and the backlight unit 11 are accommodated in a housing 12, so that a display apparatus 100 is configured. In the meantime, a transparent protective member 1 for protecting the display panel 10 is stuck to a front face side (display face of the display panel 10) of the upper polarization plate 6 on the opposing substrate 7 by a transparent adhesive 2. Also, in this illustrative embodiment, the transparent protective member 1 is arranged to cover the housing 12 having the backlight unit 11 and the display panel 10 accommodated therein.

<Transparent Protective Member>

The transparent protective member 1 that is used for the display apparatus 100 of this disclosure is formed of a glass or a resin material such as transparent acryl, polycarbonate and the like. Also, since the transparent protective member 1 is arranged to cover the housing 12 accommodating the display panel 10 therein, a transparent protective member having a size larger than the display panel 10 is used. Also, as shown in FIG. 3, the transparent protective member 1 is arranged in the display apparatus 100 with exposing a front face 1a. In a structure where a frame having a case shape covers a periphery of the transparent protective member 1, like a general display apparatus, a step is formed between the frame and the front face 1a of the transparent protective member 1, so that the functionality or design feature is deteriorated. However, when the above configuration is adopted, it is possible to improve the functionality and design features in a portable phone, a portable information terminal and the like.

<Print Part>

As shown in FIG. 3, a print part 3 is formed in a peripheral area AR of a backside face 1c, which is a face of the transparent protective member 1 facing the display panel 10 and is an opposite side to a visible side. The peripheral area AR is an area formed from a display area DR of the display panel 10 to an end portion 1b of the transparent protective member 1. The print part 3 has an opening 3a having the substantially same size as the display area DR, and the print part 3 is formed by applying ink, and the like, to the peripheral area AR corresponding to the area up to the end portion 1b of the transparent protective member 1. The print part 3 in the peripheral area AR of the transparent protective member 1 is formed by the ink of a light shielding color such as black, so that it is possible to suppress the light emitted from the backlight unit 11 from being visually recognized from an outside of the display area DR of the display panel 10 or to suppress the light leaked from a peripheral part of the opposing substrate 7 from being visually recognized from a display face of the display apparatus 100. In the meantime, the print part 3 may be formed by ink of a different color, other than the black ink, with considering the design feature.

<Sheet>

In the peripheral area AR of the backside face 1c of the transparent protective member 1, in which the print part 3 is formed, a sheet 5 to suppress the for scattering is stuck. The sheet 5 is formed of a resin-based material having a film shape such as PET (Polyethylene Terephthalate). An adhesive member 4 including a resin material is provided on one face of the sheet 5. By the adhesive member 4, the sheet 5 is stuck to the backside face 1c of the transparent protective member 1. In the meantime, a thickness of the sheet 5 is preferably about 0.1 mm.

Additionally, similarly to the print part 3 formed on the backside face 1c of the transparent protective member 1, regarding the sheet 5, a sheet of a frame shape having an opening 5a of the substantially same size as the display area DR of the display panel 10 is used. The sheet 5 is arranged so that the opening 5a of the sheet 5 and the opening 3a of the print part 3 are located at the same position, and is stuck to a position overlapping with the print part 3.

<Transparent Adhesive>

In the below, the transparent adhesive 2 is described. Regarding the transparent adhesive 2, a sheet adhesive member made of a resin material or an adhesive including a resin material is used. The transparent adhesive 2 has an area equivalent to or larger than the opening 3a of the print part 3 of the transparent protective member 1, i.e., in correspondence to a range of at least the display area DR, thereby sticking the display panel 10 to the transparent protective member 1. Additionally, the transparent adhesive 2 has a refractive index close to that of the substrate (glass, in this illustrative embodiment) configuring the display panel 10 and suppresses a multi-reflection between the display panel 10 and the transparent protective member 1, thereby suppressing the visibility from being lowered.

In the display apparatus 100 of this disclosure, when arranging the transparent protective member 1 on the housing 12 configuring the display apparatus 100 so that it covers the housing 12, the display face of the display panel 10 is stuck to the backside face 1c of the transparent protective member 1 by the transparent adhesive 2 arranged at the position corresponding to the display area DR of the display panel 10. Also, in the peripheral area AR extending from the display area DR up to the end portion 1b of the transparent protective member 1, the sheet 5 having the opening 5a corresponding to the display area DR is stuck via the adhesive member 4. Accordingly, since the transparent adhesive 2 for adhesion of the display panel 10 is arranged at the position overlapping with the display area DR of the display panel 10 and the sheet 5 is arranged with sandwiching the adhesive member 4 in the peripheral area AR that is at the outside of the display area DR, even when the pressure or shock is applied to the transparent protective member 1 from the outside and the transparent protective member 1 is thus damaged, the display area DR can suppress fragments of the transparent protective member 1 from being scattered by the transparent adhesive 2, and the peripheral area AR can suppress the fragments by the sheet 5 having the adhesive member 4. Thereby, even when the pressure or shock is applied from the outside of the display apparatus 100, it is possible to secure the safety.

In the display apparatus 100 of this disclosure, the anti-scattering function of the display area DR of the display panel 10 is provided by the transparent adhesive 2, and the sheet 5 is stuck to only the peripheral area AR via the adhesive member 4. Accordingly, it is possible to suppress the addition of new parts to the minimum and to easily perform the assembling.

The print part 3 is formed in correspondence to the peripheral area AR, so that it is possible to suppress the light emitted from the backlight unit 11 through the outside of the display area DR of the display panel 10 from being visually recognized or to suppress the light leaked from the peripheral part of the opposing substrate from being visually recognized from the display face.

Additionally, the sheet 5 arranged in the peripheral area AR is stuck to the transparent protective member 1 with sandwiching the adhesive member 4. However, when the adhesive member 4 is arranged, it is possible to suppress the fragments of the transparent protective member 1 from being scattered. Also, the sheet 5 is arranged in correspondence to the adhesive member 4, so that it is possible to suppress the adhesive member 4 from adhering to another member and the like.

Further, the sheet 5 is stuck to the peripheral area AR of the transparent protective member 1 with sandwiching the adhesive member 4. Thereby, it is possible to increase the rigidity of the transparent protective member 1, so that it is possible to suppress the transparent protective member 1 from being damaged.

Incidentally, the sheet 5 can be formed into a desired pattern and the like and arranged in the peripheral area AR. Thereby, it is possible to improve the design feature.

Furthermore, it is exemplified that the sheet 5 used in this disclosure has a continuous frame shape having the opening 5a as shown in FIG. 1. However, the sheets 5 that are appropriately divided in correspondence to the shape and size of the peripheral area AR may be used (not shown). By using the divided sheets 5, it is possible to reduce the cost of the sheet 5 and to improve the operability such as positioning.

Second Illustrative Embodiment

FIG. 4 is a sectional view illustrating the display apparatus 100 according to a second illustrative embodiment. In FIG. 4, the same components as FIG. 1 are indicated with the same reference numerals.

In the liquid crystal display apparatus of the first illustrative embodiment, the transparent adhesive 2 adhering to the transparent protective member 1 is arranged with corresponding to the display area DR, and the sheet 5 having the opening 5a corresponding to the display area DR is arranged in the peripheral area AR extending to the end portion 1b of the transparent protective member 1. However, in the display apparatus 100 of a second illustrative embodiment, the opening 5a of the sheet 5 is configured to be larger than the display area DR. The other configurations are the similar as the first illustrative embodiment, and the detailed descriptions thereof will be omitted.

As shown in FIG. 4, the opening 5a of the sheet 5 is larger than the display area DR and is arranged within the range of the peripheral area AR. The opening 5a of the sheet 5 is larger than the opening 3a of the print part 3 and same as or slightly larger than the transparent adhesive 2 arranged in the display area DR is arranged. At this time, the sheet is arranged so that an end portion of the opening 5a of the sheet 5 and an end portion of the transparent adhesive 2 facing the opening 5a have a predetermined distance D therebetween. The sheet is arranged so that the distance D between the opening 5a of the sheet 5 and the transparent adhesive 2 is preferably larger than 0 mm and smaller than 5 mm The sheet 5 is arranged on the backside face 1c of the transparent protective member 1 with the interval D with the transparent adhesive 2. Accordingly, when the transparent protective member 1 is enabled to adhere to the display panel 10 by the transparent adhesive 2, the transparent adhesive 2 is arranged within the opening 5a of the sheet 5, so that it is possible to suppress a step from being formed or to narrow a range of the step. Since it is possible to suppress the transparent adhesive 2, which is arranged in the opening 5a of the sheet 5, from forming a step, it is possible to suppress a gap caused due to the step from being formed between an end of the opening 5a of the sheet 5 and the transparent adhesive 2 on the backside face 1c of the transparent protective member 1, thereby suppressing air bubbles from being generated in the transparent adhesive 2. Therefore, even when the anti-scattering structure is provided to the transparent protective member 1, it is possible to obtain the display apparatus 100 in which a display defect due to the air bubbles is not generated.

Third Illustrative Embodiment

Figure 5:
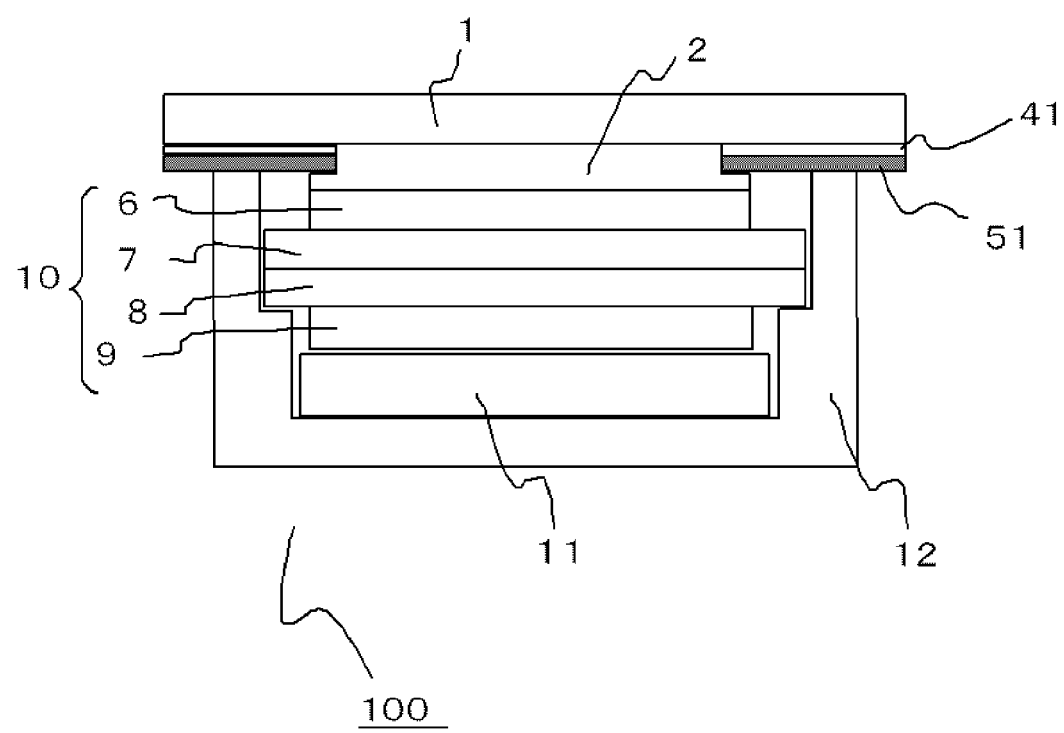
FIG. 5 is a sectional view illustrating a display apparatus according to an illustrative embodiment of this disclosure.

FIG. 5 is a sectional view illustrating the display apparatus 100 according to a third illustrative embodiment of this disclosure. In FIG. 5, the same component as FIG. 1 are indicated with the same reference numerals.

In the display apparatus of the third illustrative embodiment, the print part 3 as the first or second illustrative embodiment is not formed and a sheet 51 is formed by a member having a light shield property to shield right. In the meantime, the other configurations are the same as the first and illustrative embodiments, and the detailed descriptions thereof will be omitted.

The sheet 51 shown in FIG. 5 is formed using a material in which a black pigment and the like are mixed. Alternatively, the material in which the same pigment is mixed may be used for an adhesive member 41 provided on one face of the sheet 51.

Like this, in the third illustrative embodiment, since the sheet 51 is made of the material having a light shield property, it is possible to provide the sheet with the anti-scattering function and the light shield function. Hence, it is not necessary to perform the printing for light shield in the peripheral area of the transparent protective member 1, so that it is possible to manufacture the display apparatus 100 at a low price. Also, the assembling operability of the display apparatus 100 is improved.

In the meantime, this disclosure is not limited to the above illustrative embodiments and the illustrative embodiments can be appropriately changed and combined without departing from the scope of this disclosure.

What is claimed is:

1. A display apparatus that accommodates a display panel of displaying an image and a backlight emitting light in a housing, the display apparatus comprising:
   a transparent protective member that covers a part of the housing and is arranged at a display face of the display panel;
   a transparent adhesive member that is arranged at a position corresponding to a display area of the display panel on a face of the transparent protective member, which faces the display panel, so that the display panel is stuck;
   an adhesive member that is arranged at a peripheral area, which is provided from an outside of the display area of the display panel up to an end portion of the transparent protective member; and
   a sheet that is arranged with corresponding to the adhesive member,
   wherein the adhesive member is provided between the sheet and transparent protective member,
   wherein the sheet has an opening larger than the display area,
   wherein an end of the opening and an end of the transparent adhesive member oppose each other and are separated by a predetermined distance,
   wherein the predetermined distance extends in a direction that is substantially parallel to a rear surface of the transparent protective member
   wherein a whole of an outer circumference of the transparent adhesive member is separated from the sheet by at least the predetermined distance,
   wherein at least one of the sheet and the adhesive member has a light shield property
   wherein the adhesive member and the sheet are formed to have a continuous frame shape, and
   wherein the adhesive member and the sheet are arranged only at a position, which is the peripheral area provided up to the end portion and at which the adhesive member and the sheet face a backside face of the transparent protective member.

2. The display apparatus according to claim 1,
   wherein a print part is formed between the transparent protective member and the adhesive member on a face of the transparent protective member facing the display panel.

* * * * *